US00RE37661E

(19) United States
(12) Reissued Patent
Raunisto

(10) Patent Number: US RE37,661 E
(45) Date of Reissued Patent: Apr. 16, 2002

(54) METHOD AND APPARATUS FOR FORCING PILES INTO OR OUT OF THE GROUND

(76) Inventor: Yrjo Raunisto, Anttilankatu 13, FIN-13210, Hameenlinna (FI)

(21) Appl. No.: 09/181,986

(22) PCT Filed: Sep. 30, 1992

(86) PCT No.: PCT/FI92/00259

§ 371 Date: Mar. 30, 1994

§ 102(e) Date: Mar. 30, 1994

(87) PCT Pub. No.: WO93/07341

PCT Pub. Date: Apr. 15, 1993

Related U.S. Patent Documents

Reissue of:
(64) Patent No.: 5,568,997
Issued: Oct. 29, 1996
Appl. No.: 08/211,291
Filed: Mar. 30, 1994

(30) Foreign Application Priority Data

Sep. 30, 1991 (FI) ..... 914590
Aug. 28, 1992 (FI) ..... 923880

(51) Int. Cl.[7] ..... E02D 7/18; E02D 11/00
(52) U.S. Cl. ..... 405/232; 173/184; 405/274; 405/303
(58) Field of Search ..... 414/910, 23; 294/88; 405/232, 245, 246, 271, 274–281, 228, 303; 37/105; 173/184–187, 26, 28, 42, 44

(56) References Cited

U.S. PATENT DOCUMENTS 3,019,608 A 2/1962 Marmion
3,100,382 A 8/1963 Muller
3,112,830 A * 12/1963 Podlesak ..... 414/23
3,921,730 A * 11/1975 Farre et al. ..... 414/23 X
3,937,340 A * 2/1976 Grove ..... 414/23 X
4,703,968 A * 11/1987 LaBounty ..... 294/88
4,709,764 A 12/1987 Gibbons
5,284,375 A * 2/1994 Land ..... 294/88

FOREIGN PATENT DOCUMENTS

EP 0496167 A1 7/1992
JP 56-119031 9/1981
JP 57-184127 11/1982
JP 58-117129 7/1983

* cited by examiner

*Primary Examiner*—David Bagnell
*Assistant Examiner*—John Kreck
(74) *Attorney, Agent, or Firm*—Larson & Taylor, PLC

(57) ABSTRACT

An apparatus, connectable to a driving machine with an articulated boom system, which is operated by percussion energy and drives into or draws up from the ground piles or walls and grasps with its gripping jaws objects (17) on the ground or objects that are to be driven into the ground characterized in that the apparatus comprises a turning equipment system that transmits percussion energy to the object in order to grip with its jaws (16) the object both with a firm hold of the jaws in the blow direction and an essentially vertical grip of the jaws and that the apparatus transmits the percussion force to the object in line with its travel direction when both grips with the jaws are used.

8 Claims, 5 Drawing Sheets

Fig. 4
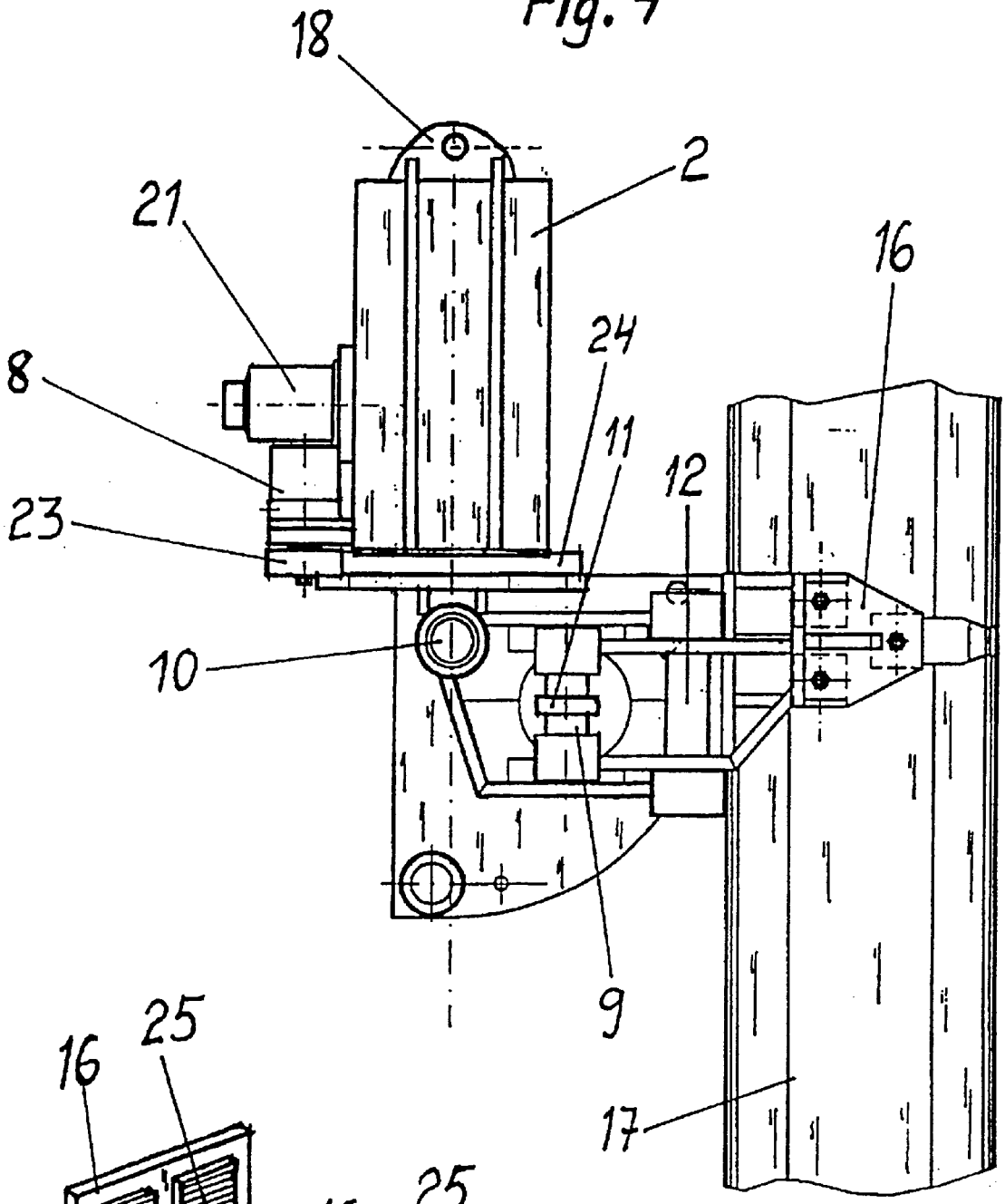
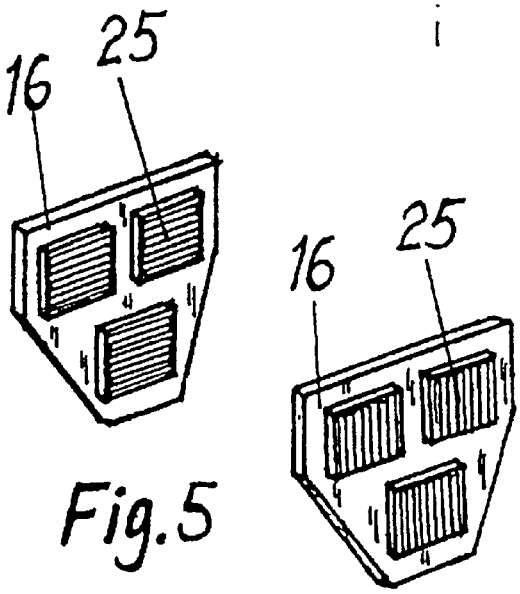
Fig.5

METHOD AND APPARATUS FOR FORCING PILES INTO OR OUT OF THE GROUND

Matter enclosed in heavy brackets [ ] appears in the original patent but forms no part of this reissue specification; matter printed in italics indicates the additions made by reissue.

The invention relates to an apparatus, connectable to a driving machine or a crane with an articulated boom system, which generates impact energy, and a method to drive into or draw up from the ground piles or similar objects.

Previously known are percussive pile drivers, connectable to cranes and driving machine, which generate the percussion and transmit it to the pile end. Especially, on driving special piles, such as wall constructions and, particularly, if they are also drawn up from the ground, the apparatus must be furnished with firm gripping jaws in order to grab the pile end and draw up the piles. Likewise, the gripping jaws are useful for lifting the piles into their place. Further, the rotative function of jaws in pile drivers are also known, by means of which plate formed profiles can be turned with the apparatus to a wanted position before starting to drive them into the ground. Also known is the turning of a vertical pile driver to horizontal position in order to grab a horizontal pile with the gripping jaws and lift it up to vertical position.

The disadvantage of the above presented drivers is the fact that they only can grip the pile end and transmit the percussions this way to the pile. Especially, when the apparatus is connected to a machine, e.g. an excavator, fitted with a boom system, very long piles cannot be handled, because the upward reach of the boom system sets limits on the pile that is being handled. The known solutions allow, indeed, gripping the pile from the side, but they do not allow driving with this grip, because the pile driver and the jaws in the known constructions are of one and the same element and therefore the percussions would drive the pile crosswise and not in the pile direction.

According to the solution of this invention these disadvantages are avoided and the invention is characterized in what is presented in the patent claims.

It can be considered the most important advantage of this invention that with the apparatus quite long piles or wall profiles can be driven into or drawn up from the ground without any limitations by the upward reach of the excavator. Further, the side grip allows also driving piles, the upper end of which is by construction or for some other reason of such kind that the percussion cannot be transmitted over it to the pile. After a short predriving and using two gripping elements arranged at a distance from each other, the driver and a part of the excavator boom system can be utilized for control of the object that is to be driven into the ground. Thereby, one or several excavator cylinders are shifted into a "floating" state by opening the valve system, where the pressure fluids on different sides of the piston can freely or almost freely flow into the cylinder or out from there. Thereby, the excavator operator avoids the difficult control of the pile driver with the boom system. The pile that is being handled can then by itself sustain its course and thereby no faulty motions or directions are transmitted to the driver.

In the following the invention is more closely defined with reference to the drawings, where FIG. 1 is the pile driver connected to an excavator FIG. 2 is a side-view of the pile driver, FIG. 3 is the pile driver viewed from the other side, FIG. 4 is a side-view of the pile driver in turned position.

FIG. 5 is the gripping jaws.

Figure 1:
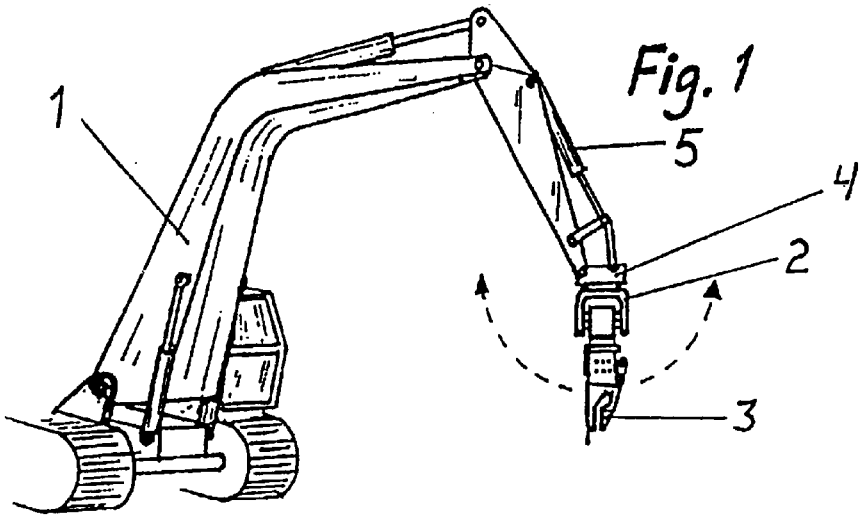

FIG. 1 shows the pile driver connected to an excavator 1 and fixed to the scoop fastener 4. Thereby the excavator scoop cylinder 5 allows turning the driver to the pile directions. With these movemements the gripping jaw 3 in the driver can be placed in proper position to grip horizontal piles or walls. Thereby the driver can grip and lift up or let down piles or similar objects. The driver has an archlike fastening frame 2.

Figure 2:
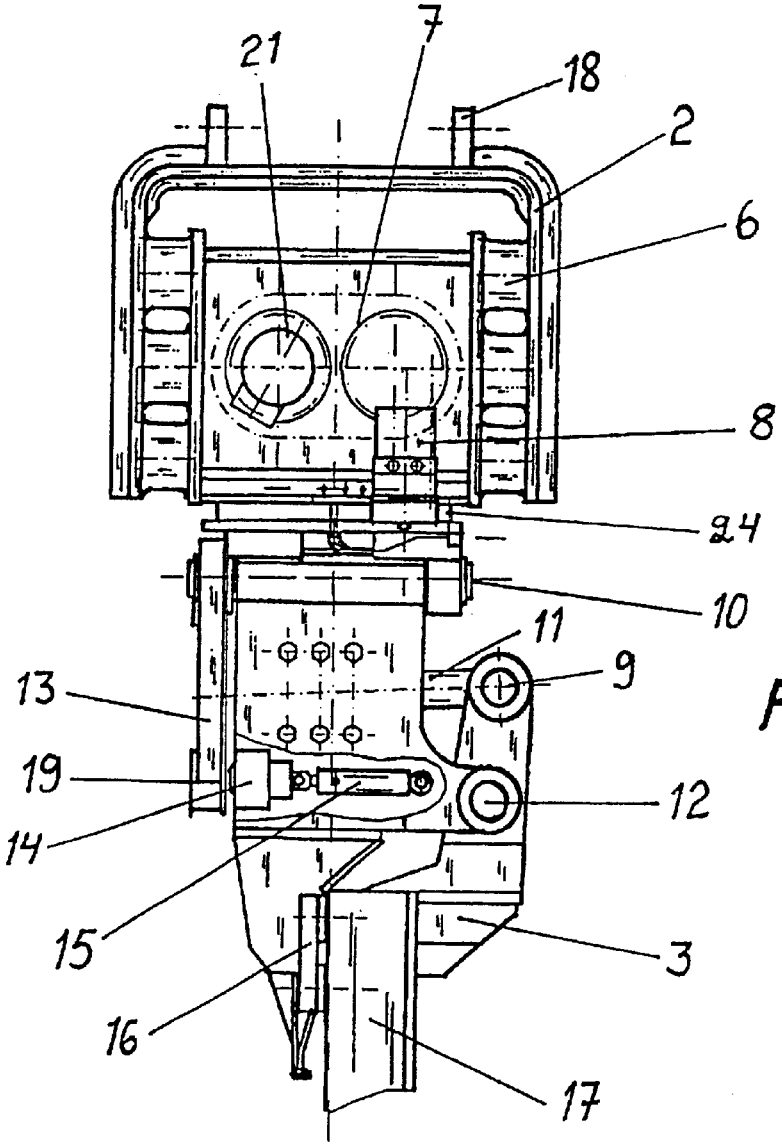

FIG. 2 shows the driver from the side. There are lugs 18 in the fastening frame 2. Frame 2 is isolated from the driver with buffing rubbers. Under the driving equipment of the driver there is a rotatory equipment, i.e. a driving motor 7 and a toothed gear 24 and bearings for rotation. The whole lower part of the driver can be rotated around its vertical axle, which is shown in the figures, and locked. In the lower driver part there is a fixed jaw unit, a jaw 16 and another mobile jaw 3. A plate profile 17, which is to be driven into the ground, is pressed in between the jaws. The mobile jaw is articulated by axle 12 and the jaw is driven by cylinder 11. The figure also shows a horizontal axle 10, around which the driver lower part can be rotated 90° sideways, which is another advantageous position of operation. The sideways turning as well as the vertical driver position are locked by cylinder 15, by means of which and controlled by part 14 a locking element, for instance a pin or a ball, is pushed into the fixed frame part 13, which has a locking hole 19. The locking pressure of the locking cylinder 11 can be in contact with the pressure in the jaw-pressing cylinder 11. The situation shown in the figure is a usual driving state, where the direction of the driver 7 percussions is either upward or downward.

Figure 3:
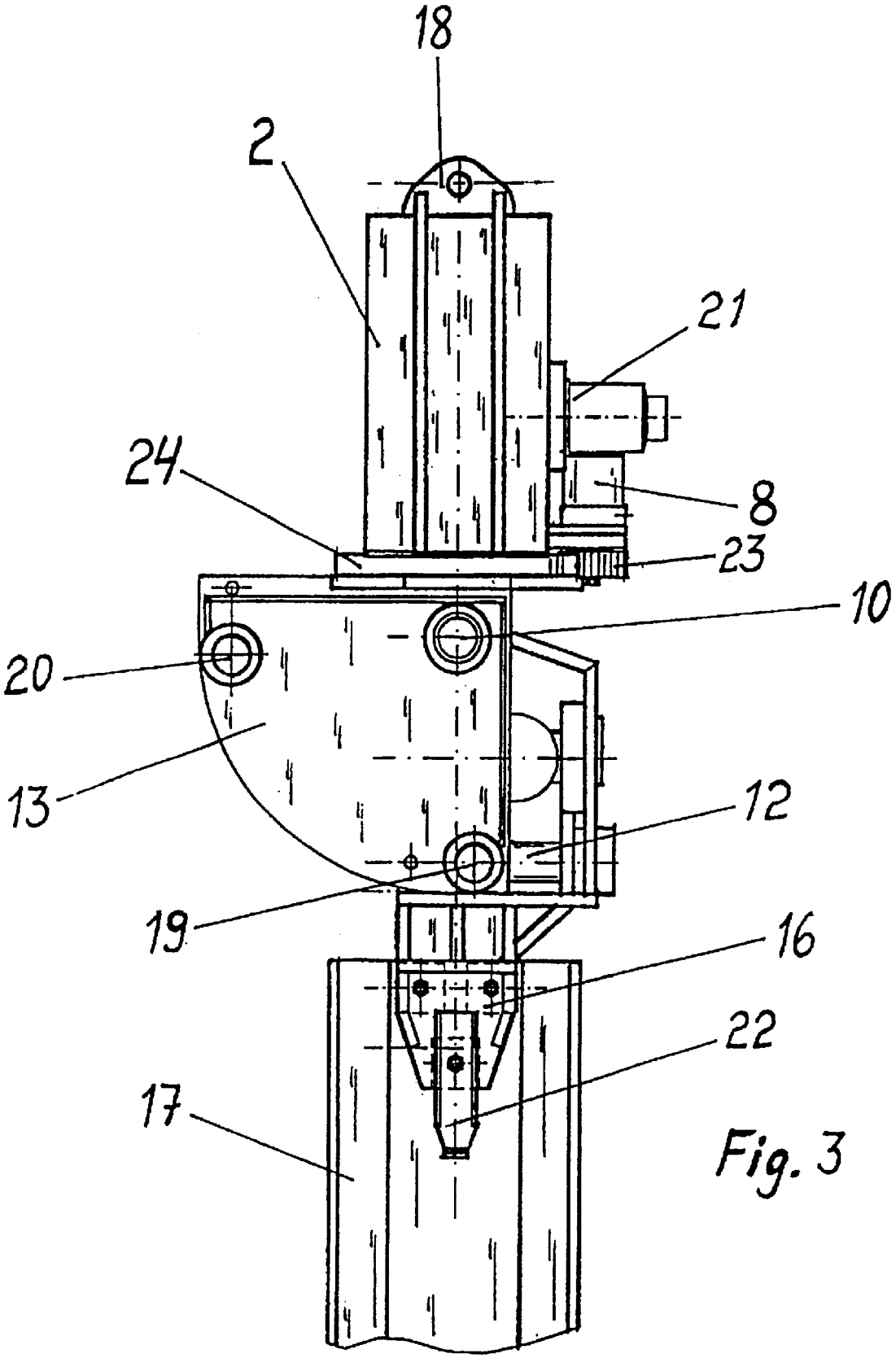

FIG. 3 shows the same driver viewed from the other side, whereat motor 8, which rotates the lower part, and gear drive 23, 24 are more clearly visible. The fixed frame 13 of the rotatory equipment, that rotates the lower part, comprises two locking positions 20 and 19 which are in a 90° angle to each other. Jaw 16 has an extension 22, which is used for raising an individual profile 17, as the one in the figure, when lifting it from a pile.

FIG. 4 shows the driver in turned position, whereby profile 17 has been gripped from the side. Jaws 16 must be of such a design (as shown in the figure) that no changes of the profile can hazard the grip. The driver is brought to a turned position either by the force of gravity or by force generated by the excavator boom system when the locking of the turning device has first been opened.

In the situation as per the figure the vertical percussions generated by the driver are transmitted over the driver to the jaws and have a further vertical impact on profile 17. The length of the profile is therefore not limited by the reaches of the driving machine because the side grip can be shifted further up or down, if necessary. On the other hand, when working under bridges, the side grip allows operation with full-length piles, because neither the driver nor any other machine parts will form an extension in the pile. Of course, it is possible to carry out the turning motions of the turning system by utilizing any other known method but, in order to keep the construction as simple as possible, it is advantageous if the apparatus itself does not include any mechanism to carry out the turning.

FIG. 5 shows jaws 16 which have three grip bits 25 each. The grip bits have grooves or, correspondingly, brushes that grab profile 17. The groove directions in the bits must be cross-wise to the driving direction in order to prevent sliding on the profile surface. The bits 25 shown in the figure can be turned both vertically and crosswise in their seatings in the jaws. It is advantageous to arrange square shallow seatings for the bits in the jaws to prevent them from revolving during pressing. However, the bits must yield outward from the seating, so that they can be turned 90° to another position when the grip is changed. For the bits [ther] *there* is on the back of the jaws a fastening screw and a spring that yields at least so much that the bit can be turned in the seating without opening the screw. Other means of fastening the bits are, of course, also possible.

When working with the side grip, as shown in FIG. 4, the grip must be taken appr. from the middle of the pile and when the pile is lifted from the horizontal, buckling and breaking of profile wall piles is quite possible. It is then advantageous to use an additional support in the driver to support the pile at a proper distance from the grip point.

Figure 6:
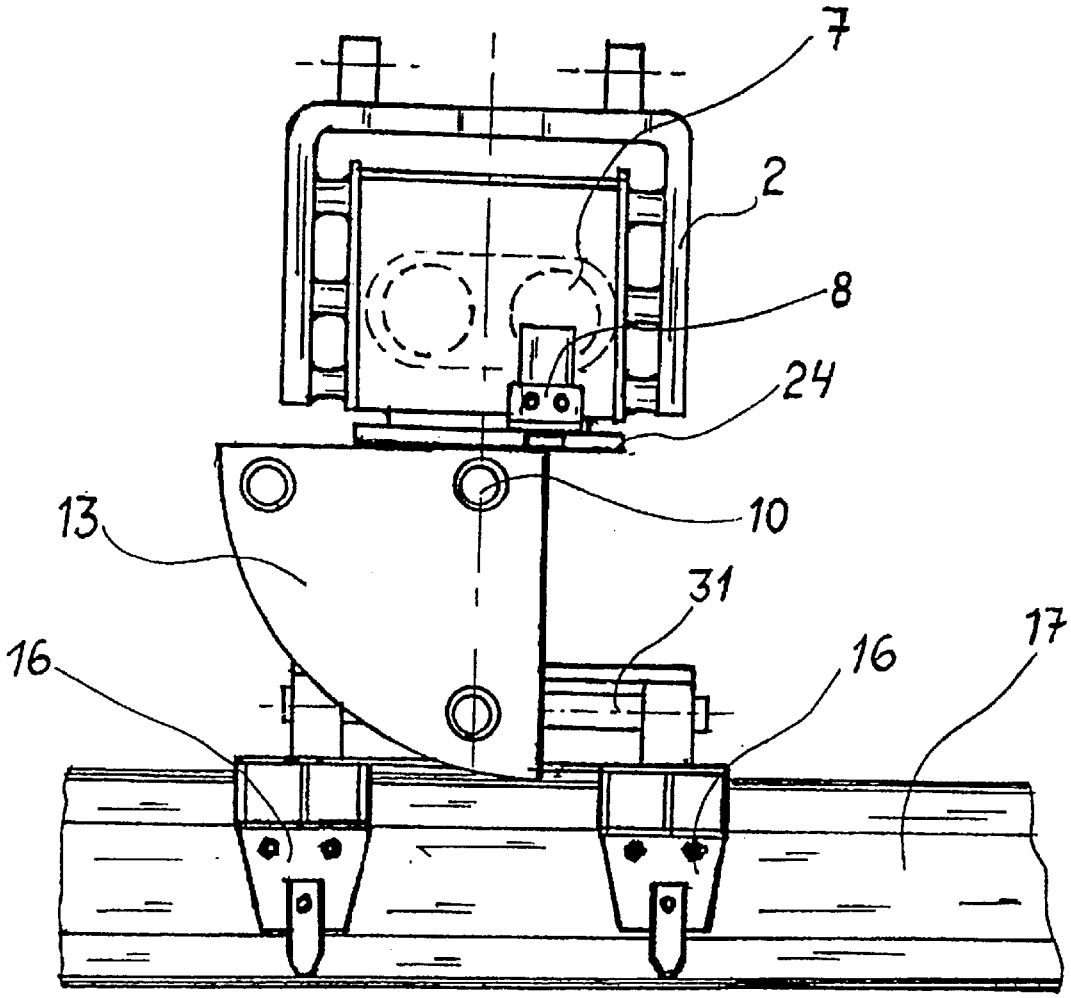
FIG. 6 is a side-view of the driver connected to an excavator and equipped with a turning device.

FIG. 6 shows a driver connected to an excavator. The driver is inside frame 2 and driven by a fluid motor. The frame is isolated with buffing rubbers from the driver. Under the driving mechanism there is a driving motor 8, a toothed gear 24 and bearings for rotation. The whole lower part of the driver is turnable around the vertical axle in the figure and lockable. In the lower part of the driver there are jaws. A profile of plate 17 that is to be driven into the ground, is pressed in between the jaws. The jaws are articulated by an axle 31 [spo] *so* as to open and close simultaneously. The jaws are driven by a cylinder, that is not shown. In a situation as per the figure, the profile has been gripped and it still must be turned 90° before starting driving it into the ground—*that is, the first and second gripping jaws are in a first position in which the first and second gripping jaws are oriented vertically away from the movement permitting means or lower part of the driver and spaced apart horizontally for grasping a horizontally oriented pile or wall edge.*

Figure 7:
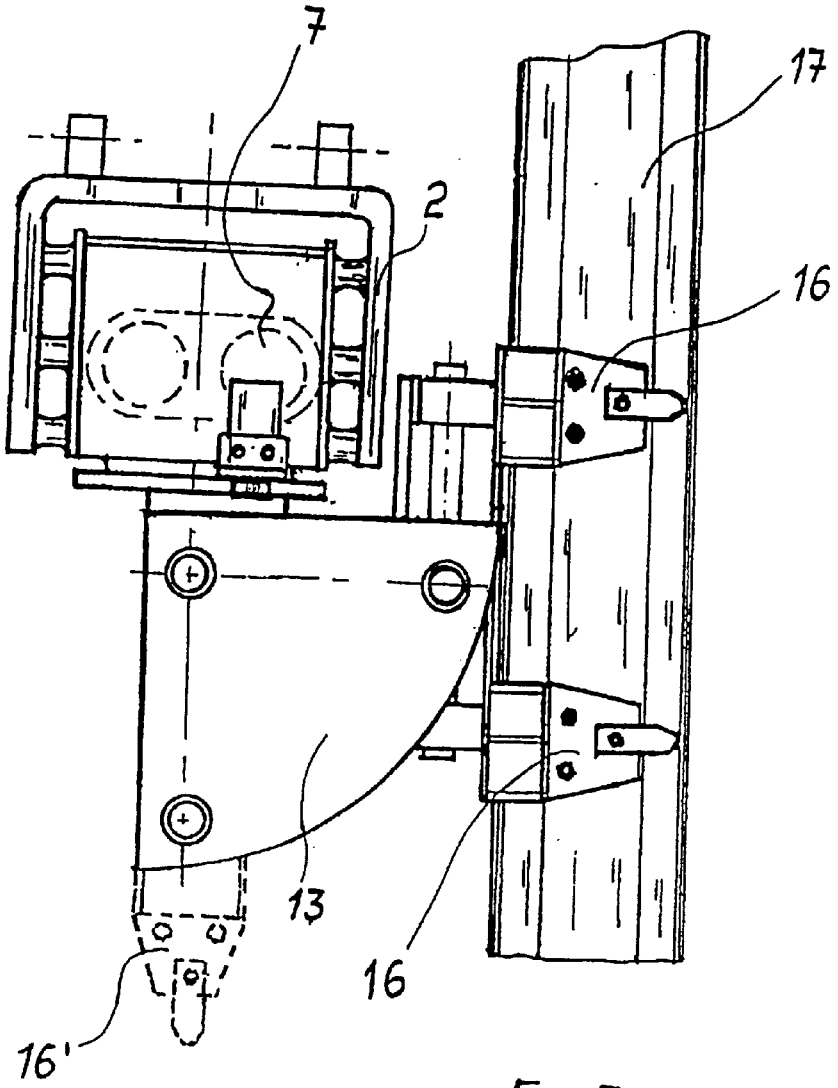
FIG. 7 is a side-view of the driver fastened to the pile end and a cylinder valve system.

FIG. 7 shows the same driver in profile-driving position. When there are two jaws, the plate that is bent into profile form, sustains firmly its course with respect to the jaws during handling and driving—*that is, the first and second gripping jaws are in a second position in which the first and second gripping jaws are oriented horizontally away from the movement permitting means or lower part of the driver and spaced apart vertically for gripping a vertically oriented pile or wall edge.* With a broken line a possible third jaw 16' is shown in the figure by means of which driving can be carried out from the profile end in the last stage of driving. In this case the driver must not be turned [due] to *effect* driving from the profile end, for which work jaws 16 would, naturally, also be suited. A driver with three jaws 16 and 16' in a position as per FIG. 7 is applicable for driving without a slide-turning possibility, which is not necessarily needed when jaws 16 are always in sideways and vertical grippings and percussions are done with jaws 16'.

Figure 8:
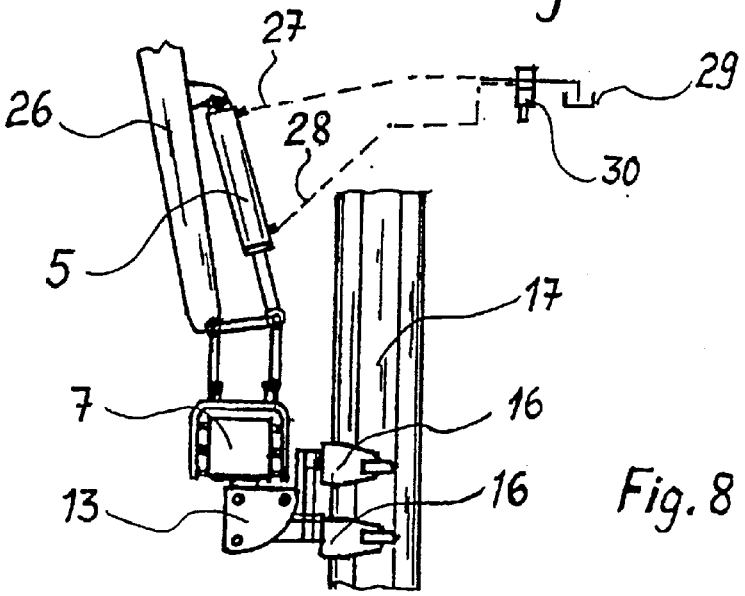
FIG. 8 shows a driver in an excavator boom and a cylinder functioning as an activator for the boom.

FIG. 8 shows a driver in an excavator boom 26 and a cylinder 5 functioning as an activator that moves, tilts to a certain extent and turns the boom. From pressure-blocking lines leading to cylinder 5, branch lines 27, 28 have been taken to the valve system, by means of which the pressure fluid on different sides of piston 5 can flow over valve 30 either to the return pipe line 29 or from one side of the piston the other side or both ways. Due to the system, with valve 30 open, the motions by one or several cylinders [must] *need* then not be controlled by the driver driving mechanism. The system may be done to comprise even more cylinders.

The invention is not limited only to the presented embodiment but several modifications are possible within the frames of the inventional idea determined in the patent claims. For instance the mutual disposal order of the driving equipment, rotatory equipment and turning equipment can therefore vary in the boom end.

I claim:

1. Pile driving apparatus comprising:

an articulated boom system adapted to transmit a percussive driving force to a pile driver attached to said boom;

hydraulic means mounted on said boom for controlling the position of a pile driver attached to said boom to orient the attached pile driver into a pile driving position; and a pile driver attached to said boom, said pile driver comprising first and second spaced apart gripping jaws, means for permitting movement of said first and second jaws between a first position in which the first and second gripping jaws are oriented vertically *away from said movement permitting means* and spaced apart horizontally for grasping a horizontally oriented pile or wall edge, and a second position in which the first and second gripping jaws are oriented horizontally *away from said movement permitting means* and spaced apart vertically for gripping a vertically oriented pile or wall edge, means for locking said first and second gripping jaws in said first position for gripping a horizontally oriented pile or wall edge at first and second horizontally spaced apart positions along said pile or wall edge and for locking said first and second gripping jaws in said second position for gripping a vertically oriented pile or wall edge at first and second vertically spaced apart positions along said pile or wall edge for driving a vertically oriented pile or wall gripped by said first and second spaced apart gripping jaws;

said apparatus further comprising valve means for disengaging said hydraulic means from control of said position of said attached pile driver.

2. Apparatus according to claim 1 comprising a further gripping jaw oriented at right angles to said first and second spaced-apart gripping jaws such that said further gripping jaw is oriented substantially vertically downward when said first and second jaws are oriented substantially horizontally.

3. Apparatus according to claim 1 wherein at least one of said first and second jaws includes a gripping member mounted on at least one gripping face of said at least one of said first and second jaws, said gripping member having a pre-determined gripping orientation, and wherein said apparatus further comprises means for mounting said gripping member on said gripping face such that the gripping member can be positioned in said pre-determined gripping orientation when said first and second gripping jaws are in said first or second position.

4. A method of driving a pile or wall into the ground or of drawing a pile or wall out of the ground which comprises gripping a pile or wall with pile driving apparatus according to claim 1, and applying a percussive force to said pile driver to drive the gripped pile or wall into the ground or to draw the gripped pile or wall out of the ground.

5. A method according to claim 4, wherein the pile is driven into the ground and wherein, after the pile is partially driven into the ground, said valve means is actuated to disengage said hydraulic means before the pile is fully driven into the ground.

*6. Pile driving apparatus comprising:*

*an articulated boom system adapted to transmit a percussive driving force to a pile driver attached to said boom;*

*a hydraulic system mounted on said boom which controls the position of a pile driver attached to said boom to orient the attached pile driver into a pile driving position;*

*a pile driver attached to said boom, said pile driver comprising*

*a main part,*

*first and second spaced apart gripping jaws, and*

*means for permitting movement of said first and second jaws between a first position in which the first and second gripping jaws are oriented vertically away from said movement permitting means and spaced apart horizontally for grasping a horizontally oriented pile or wall edge, and*

*a second position in which the first and second gripping jaws are oriented horizontally away from said movement permitting means and spaced apart vertically for gripping a vertically oriented pile or wall edge; and*

*means (a) for moving said first and second gripping jaws to and locking said first and second gripping jaws in said first position for gripping a horizontally oriented pile or wall edge at first and second horizontally spaced apart positions along said pile or wall edge and (b) for moving said first and second gripping jaws to and locking said first and second gripping jaws in said second position for gripping a vertically oriented pile or wall edge at first and second vertically spaced apart positions along said pile or wall edge for driving a vertically oriented pile or wall gripped by said first and second spaced apart gripping jaws.*

*7. Pile driving apparatus according to claim 6 wherein each of said first and second gripping jaws, when the pile driver is oriented in the pile driving position, comprises a pair of opposed, horizontally extending jaw members, each of said extending jaw members having a vertically oriented gripping face.*

*8. Pile driving apparatus according to claim 7 wherein a jaw member of each of said pairs of said jaw members is movable relative to the other jaw member of a respective pair of said jaw members, and wherein the apparatus further comprises means for moving each of said movable jaw members relative to the other jaw member of a respective pair of jaw members.*

* * * * *